(12) United States Patent
Cheng

(10) Patent No.: US 6,915,814 B2
(45) Date of Patent: Jul. 12, 2005

(54) TRANSPARENT PIPE TRAP WITH MEANS OF ENHANCING THE BIODEGRADATION OF SINK EFFLUENTS

(76) Inventor: Dara Cheng, 2717 Preece St., San Diego, CA (US) 92111

( * ) Notice: Subject to any disclaimer, the term of this patent is extended or adjusted under 35 U.S.C. 154(b) by 322 days.

(21) Appl. No.: 10/233,887

(22) Filed: Sep. 4, 2002

(65) Prior Publication Data

US 2004/0040597 A1 Mar. 4, 2004

(51) Int. Cl.$^7$ .......................... E03C 1/282; B01D 39/00
(52) U.S. Cl. .................. 137/247.51; 137/268; 137/546; 4/292; 210/506
(58) Field of Search ...................... 137/247.35, 247.39, 137/247.51, 268, 546; 4/292, 679; 210/203, 506, 508

(56) References Cited

U.S. PATENT DOCUMENTS

| | | | | |
|---|---|---|---|---|
| 278,045 A | * | 5/1883 | Reich | 137/268 |
| 340,202 A | * | 4/1886 | Edwards | 137/247.35 |
| 644,142 A | * | 2/1900 | Mulherin | 137/247.51 |
| 852,044 A | * | 4/1907 | Van der Minden | 4/291 |
| 957,709 A | * | 5/1910 | Phillips | 137/268 |
| 1,198,759 A | * | 9/1916 | Pinder et al. | 137/247.51 |
| 1,817,376 A | * | 8/1931 | Izquierdo | 4/292 |
| 4,045,351 A | * | 8/1977 | Peterson | 4/292 |
| 4,164,048 A | * | 8/1979 | Kampfer et al. | 4/292 |
| 4,448,695 A | * | 5/1984 | Gordon et al. | 210/694 |
| 4,735,228 A | * | 4/1988 | Boedecker et al. | 137/268 |
| 6,153,095 A | * | 11/2000 | Francisco | 4/292 |

FOREIGN PATENT DOCUMENTS

WO    WO99/27831    * 6/1999

* cited by examiner

Primary Examiner—John Rivell
(74) Attorney, Agent, or Firm—Eric A. Hanscom

(57) ABSTRACT

A transparent pipe trap with means of enhancing the biodegradation of sink effluents in a household sink uses a screen located "downstream" from the trap to deflect valuable items into the trap. The trap is easily drained and easily removed, for convenient retrieval of valuable items, such as rings, which are lost down a sink or other drain. The invention also promotes the biodegradation of sink effluents through time-release biodegradation substances in the cup and/or coated upon the screen.

5 Claims, 1 Drawing Sheet

TRANSPARENT PIPE TRAP WITH MEANS OF ENHANCING THE BIODEGRADATION OF SINK EFFLUENTS

CROSS REFERENCE TO RELATED APPLICATIONS

None.

REFERENCE TO SEQUENCE LISTING

This is a mechanical device, not a DNA invention, so no sequence listing is applicable.

STATEMENT REGARDING FEDERALLY SPONSORED RESEARCH OR DEVELOPMENT

This invention was not federally sponsored.

BACKGROUND OF INVENTION

A major problem which has existed for centuries has been the fact that once a valuable item, such as a ring, coins, or jewelry, washes down a drain, it is difficult, unpleasant and in some cases impossible to retrieve the valuable item before it enters a sewer line or septic system. While the object can frequently be retrieved from the "J" or "U" trap, or "elbow" below the sink, it is a difficult and unpleasant job. First, the pipe trap must be loosened by removing two large retaining nuts, which requires the use of tools such as heavy plumber's wrenches. Next, the trap is slid off, but during its removal the water trapped in the "elbow" can spill all over the floor and create a mess. After removing the item, the elbow section must be installed, and removed again every time an object is dropped down the drain, thereby causing wear and tear on the threads of the connecting parts of the plumbing system. Accordingly, there exists a need for a means by which items that have fallen down a sink can be easily retried without the disadvantages as described above.

There have been proposed several methods of preventing this from happening, including several discussed below. Unfortunately, none of these inventions solve the additional problem that food particles and other residue that collects in the elbow portion of the plumbing system ferments, rots, and undergoes other unsanitary processes resulting in not only a potential health hazard, but also an extremely smelly and unpleasant process when the elbow is removed to retrieve a lost item. There have been proposed several methods of adding a biodegradation enhancer as well as several separate inventions directed toward drain traps which captures valuables washed down from a sink or other device. None of these inventions successfully combine both an item retainer with an effective method of enhancing the biodegradation of food particles and other residue coming out of a sink.

The current invention provides a solution for these two problems. The Transparent Pipe Trap with Means of Enhancing the Biodegradation of Sink Effluents, as its name implies, is a pipe trap for the drain line of a sink or other washing container that attaches to the existing plumbing at the elbow section, and has a clear, see-through cup with an integral drain. Valuable items are prevented from being lost into either a septic tank or main sewer line by a screen removably attached "downstream" from the trap. The invention proposes two methods for adding a time-released, biodegrading substance to the water trapped in the plumbing: a time-release tablet held by a lever within the cup itself, and, alternatively or in conjunction with the tablet, a time-release coating of a biodegradation enhancing substance on the screen itself. Since the screen can consist of either a mesh of horizontal and vertical bars, or a flat piece of plastic, metal, or some other suitable compound, the means of coating the screen with the biodegradation enhancing substance will vary.

The invention is installed in place of a conventional "J" or "U" trap directly below the sink or other washing container. The invention functions in the same manner as a conventional trap by holding a small amount of waste water to act as a barrier against sewer or septic tank gasses. If a small object such as a rig of other piece of jewelry should be dropped down the drain, the object will fall into the cup on the bottom of the trap. The object can be viewed through the transparent cup. To remove the object, the water in the trip is first drained by opening a small valve on the bottom of the transparent cup.

The invention is also ideal for viewing the condition of the trap to see whether or not clogs or backups are present, and to check on the condition of the biodegradation enhancing substance to see whether it needs to be replaced. The use of the Transparent Pipe Trap with Means of Enhancing the Biodegradation of Sink Effluents allows for easy inspection of normally inaccessible pipe traps, allows for easy and sanitary retrieval of fallen objects in a manner which is quick, easy, and efficient, and enhances the biodegradation of food particles and other effluents which collect in the elbow portion of a plumbing system, thereby increasing the sanitation of the plumbing unit and making removal of the unit more sanitary and pleasant.

There have been a number of inventions related to adding biodegradable substances to septic tanks and toilet, but none adequately solved the problem addressed by this invention. Lin's '882 patent teaches a biodegrading substance, but the invention must be applied by hand every time it is used—there is no time-release of the biodegrading substances. Craig's '513 and '094 patents teach physical systems using foam blocks, with little relevance to biodegradation of effluents and completely lacking a trap system.

There have also been a number of inventions related to traps and plumbing systems, none of which combine both an easily operated trap with a biodegrading effect. For example, the '816 patent issued to Welsh discloses a sink trap which is devised to be mounted in a different manner than this invention and does not have the drain trap this invention teaches. The '095 patent issues to Francisco discloses a similar mounting mechanism to this invention and also teaches a drain plug, but fails to solve the problem of biodegrading food particles and other residues. The Francisco patent also is not designed to fit in the elbow section of the plumbing system, thus even if Francisco had taught the use of biodegrading compounds his Drainpipe Filter Kit would not be placeable in a location where the biodegradable compounds would be effective. The '816 patent issued to Weltsch teaches a screen filter device located at the bottom of the elbow, but the attachment mechanism is not threaded and appears to have a less effective sealing mechanism between the trap and pipe portions, and the Weltsch patent does not teach any biodegradation mechanism. The '922 patent issued to Gleason teaches a debris collection device which does not have a screen or trap portion, and fails to teach a biodegradation mechanism. The '234 patent issued to Senninger teaches a testing device which uses a threaded method of connection but fails to teach the screen or trap, and biodedgredation components of the present invention. The '288 patent issued to Fell and the '569 patent issued to Ruiz teach similar test uses, and also fail to teach the screen/trap and biodegradation components. The Disposable Plastic Trap Bag, issued as the '392 patent to Hayes, offers a similar method of trapping particles in a fluid, but is not designed to fit in the elbow section and fails to teach the biodegradation function of the present invention. The '055 patent issued to Riker shows impressive sophistication for an 1884 patent, but fails to teach threaded connections, screen/trap elements, and biodegradation elements of the current invention.

BRIEF SUMMARY OF INVENTION

The present invention is directed to a drain trap which allows for the retention of valuable items in the lower portion of a plumbing pipe connecting a sink or other washing device to a sewer line or septic tank, in which the actual trap device assists with the biodegradation of any food particles and other residues remaining in the pipe.

It is therefore an object of this invention to provide a means by which a valuable item, such as a ring, is retained in the drain trap rather than being lost into the sewer line or septic tank.

It is a further object of this invention that the drain trap assist in the biodegradation of food particles and other residues left in the drain elbow. This can be accomplished by two main embodiments of this idea: first, having a drain trap into which a biodegradation tablet can be inserted on a regular basis; and second, having the drain trap itself be shaped like a coarse screen and having the screen portion coated with a biodegradation substance which gradually disintegrates into the water trapped in the elbow portion.

Other and further objects and features of this invention will be apparent to one skilled in the art.

DETAILED DESCRIPTION OF THE INVENTION

The present invention is directed to a drain trap which not only retains valuable items in the trap portion and prevents them from passing through the plumbing which connects a sink or other washing device to a sewer line or septic system, but also releases a biodegrading agent into the water retained in the drain elbow, enhancing the biodegradation of food particles and other residue remaining in the drain elbow.

The invention consists of two main approaches to retaining valuables and enhancing the biodegradation within the elbow of a plumbing system: in addition to the pipe trap built into a "U" or "J" shaped elbow, having a tablet of biodegradation enhancing substance held in place in the clear container, and/or having the screen element coated with a biodegradation enhancing substance.

Figure 1:
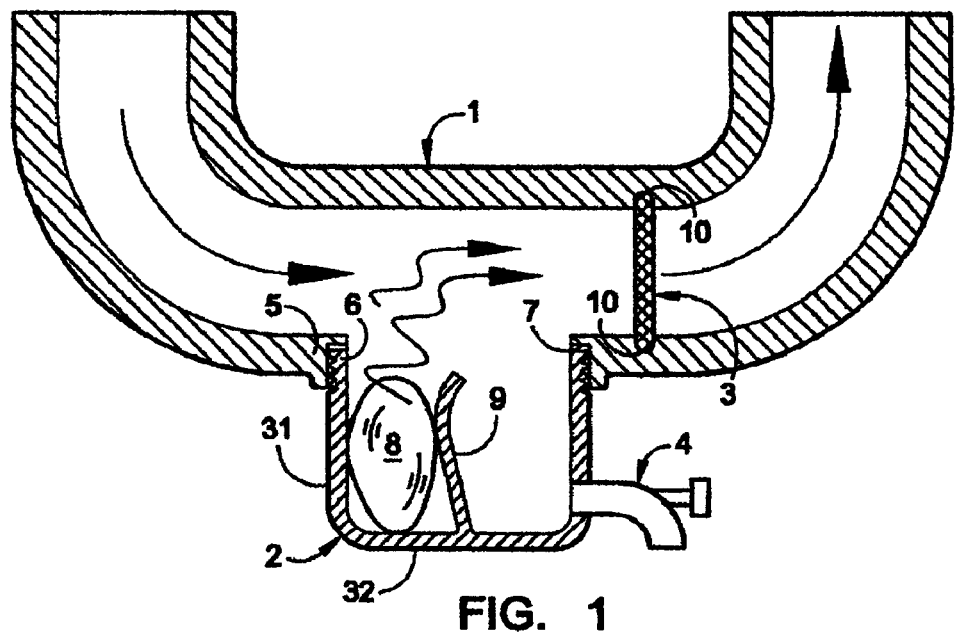
FIG. 1 is a side view of a "U" shaped pipe trap (1) showing the removable trap basin (2), the removable screen (3), and the drain valve (4).

Referring to FIG. 1, a "U" shaped elbow is shown, which consists of a drain pipe elbow section of the "U" design common in the plumbing trade (generally indicated by reference number 1), a screen (3) with a cross lattice of vertical and horizontal bars. In the preferred embodiment of this invention, the screen is coated with a time-release biodegradation enhancing agent. The screen is coated with enough agent to gradually time-release the biodegradation agent over a period of months to years, such that the drain traps can be promoted as lasting a set period of time before being needed to be replaced. The screen fits into slots (10) which have been designed and constructed into the elbow section (1) which is manufactured separately from the screen.

Below the elbow section (1) and screwing into threads (5) built into the elbow section is a container (2). The container has threads (6) built into the top of the container which fit into the threads (5) built into the elbow section (1). There is a gasket (7) which serves to seal any leakage between the two sets of threads. The container (2) consists of a cylindrical portion (31), with a bottom (32). Coming out vertically from the bottom of the cylindrical portion (31), that portion directly above the bottom (32) is a purge valve (4) which serves to release the water trapped in the elbow when an operator wishes to remove the elbow section and remove a trapped valuable item. By using the purge value over a bucket or other water retaining device, the water from the elbow and container can be drained so that the elbow can be removed without spilling water on the floor.

In another iteration of the biodegradation enhancing means, the container (2) bottom has a clasp (9) portion extending up from the bottom (32) which is angled from the center of the bottom toward the cylindrical side (31). The purpose of this clasp (9) is to hold in place a tablet of biodegradation enhancing substance (8). As with the screen (3), the tablet (8) is a time release substance which is available in several sizes with different useful lifetimes for each, such that a user will be able to schedule when to replace the tablet, or can check the elbow to see whether the tablet is completely dissolved.

In both iterations, the goal of the invention is to provide both a drain trap and mean of releasing over time a substance which enhances biodegradation.

Figure 2:
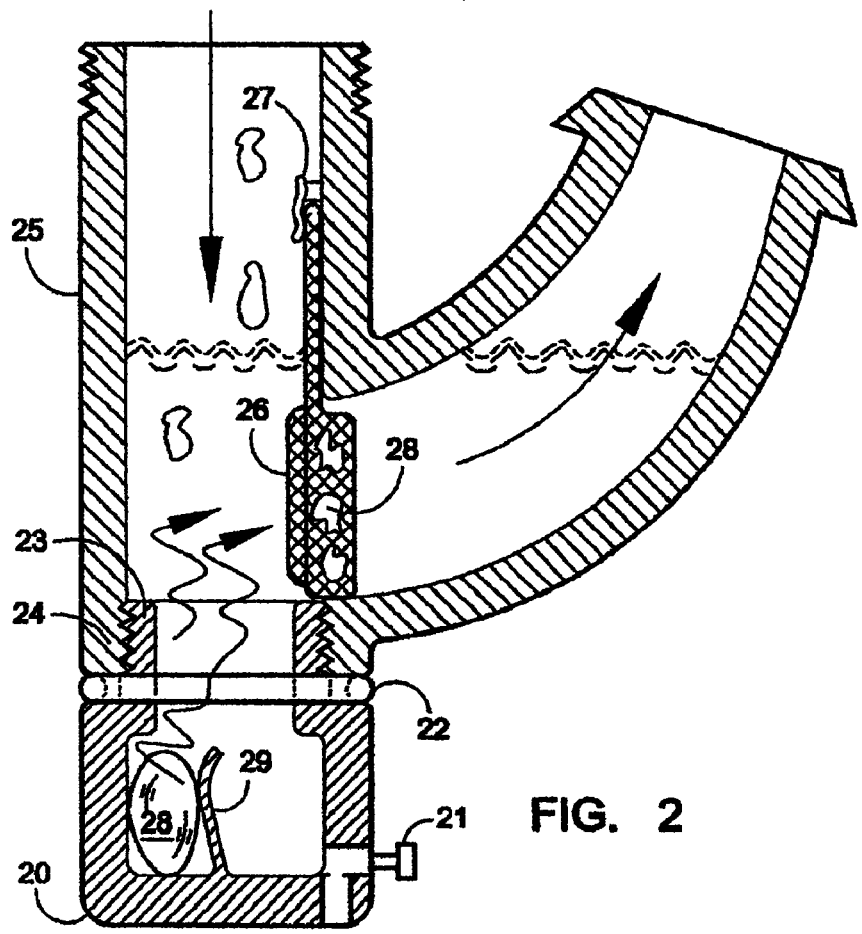
FIG. 2 is a side view of a "J" shaped pipe trap (25) showing the removable trap basin (20), the removable screen (28), and the drain valve (21).

Referring to FIG. 2, this figure shows the "J" configuration of a standard drainage pipe, which has generally the same parts of means of operation as the "U" configuration shown in FIG. 1, showing the clear plastic cup (20), with its drain (21), and threaded portion (23), mating with a threaded portion (24) of the pipe section (shown generally as 25), separated by an O-Ring (22). The invention, in the preferred embodiment, has a screen (28) perforated with a number of holes, and impregnated with an effluent dissolving compound, forced against the opening of the pipe by means of a straight clamp (26) held in place by a latch (27). In another iteration of the biodegradation enhancing means, the clear plastic cup (20), there is a tablet of biodegrading enhancing substance (28), held in place by an angled piece of plastic or clasp (29) which serves to hold the table in place.

Other and further objects and features of this invention will be apparent to one skilled in the art.

What is claimed is:

1. A pipe trap for a drainage system, comprising:
    an elbow unit consisting of a tubular section constructed of plastic, metal or another suitable substance commonly in use in plumbing trade, constructed in a "U" or "J" shape typical to the plumbing trade,
    said elbow unit also comprising:
        threads or other suitable means of connecting the elbow unit to standard plumbing pipes emanating from sinks and other washing units,
        a threaded section into which the threads of a retention container can fit,
        a slotted extrusion on either side of said tubular section into which a screen can fit, a screen which functions as a filtering device, shaped such that it fits into said slotted extrusion on said elbow unit, where, said screen is located in such a position where part of it will remain in that portion of a "J" or "U" portion of a drain pipe form a sink that is normally full of wastewater from the sink, a retention container which consists of threads which allow said retention container to be screwed into said elbow unit, a cylindrical portion, a top connecting said cylindrical portion to said threads, a bottom, and a purge valve built into said cylindrical portion, where the retention container can be built from clear plastic, such that a person can view the contents of the retention container, and where the screen is coated with a biodegrading enhancing substance which dissolves gradually over time in a time release manner.

2. The pipe trap of claim 1 where:

the time release of the biodegrading enhancing substance is accomplished through impregnating the filter with biodegrading particles suspended in a matrix of semi-permeable, semi-water repellent material which gradually releases the biodegrading enhancing substance over a prolonged period of time such that a user does not have to replace the filter frequently.

3. The pipe trap of claim 2 where:

the screen is a flat panel constructed of plastic, metal, or some other suitable substance, perforated with holes of diameter of ½ inch or less, a size intended to be small enough to effectively trap rings, coins, and other valuables.

4. The pipe trap of claim 2 where:

the retention container has built into its bottom a lever angled from the bottom to side of the cylindrical portion, constructed such that said lever can hold a tablet of biodegrading substance in place.

5. The pipe trap of claim 4 where:

the lever is designed such that it touches the side of the cylinder such that as the tablet dissolves over time, the lever continues to hold said tablet in place through friction.

* * * * *